(12) United States Patent
Sugano et al.

(10) Patent No.: US 6,217,267 B1
(45) Date of Patent: Apr. 17, 2001

(54) COLD FORMING TAP HAVING INTERNAL FINISH CUTTING EDGE AND METHOD OF PRODUCING THE SAME

(75) Inventors: Hiroto Sugano, Shinshiro; Shigeru Hayashi, Toyohashi; Kazumitsu Minagawa, Toyokawa, all of (JP)

(73) Assignee: OSG Corporation, Toyokawa (JP)

( * ) Notice: Subject to any disclaimer, the term of this patent is extended or adjusted under 35 U.S.C. 154(b) by 0 days.

(21) Appl. No.: 09/242,453
(22) PCT Filed: Jul. 16, 1997
(86) PCT No.: PCT/JP97/02473
  § 371 Date: Feb. 17, 1999
  § 102(e) Date: Feb. 17, 1999
(87) PCT Pub. No.: WO99/03631
  PCT Pub. Date: Jan. 28, 1999
(51) Int. Cl.[7] .................. B23G 5/06; B23G 7/02
(52) U.S. Cl. .................. 408/222; 408/220; 470/198; 470/204
(58) Field of Search .................. 408/222, 217–219, 408/220; 470/198, 84, 204; 76/101.1

(56) References Cited

U.S. PATENT DOCUMENTS

| | | | |
|---|---|---|---|
| 274,492 | * | 3/1883 | Harvey .................................. 470/198 |
| 992,946 | * | 5/1911 | Edwards ............................... 470/198 |
| 3,069,961 | * | 12/1962 | Baubles .................................. 470/84 |
| 3,226,743 | | 1/1966 | Watkins . |
| 3,251,080 | * | 5/1966 | Sharon .................................. 470/198 |
| 3,775,792 | * | 12/1973 | Leonard ............................... 470/204 |
| 4,673,323 | * | 6/1987 | Russo .................................... 470/198 |
| 5,035,019 | * | 7/1991 | Dias ...................................... 470/204 |
| 5,037,251 | * | 8/1991 | Roth ..................................... 408/222 |
| 5,562,371 | * | 10/1996 | Reed ..................................... 408/222 |
| 5,664,915 | * | 9/1997 | Hawke .................................. 408/222 |
| 5,725,336 | * | 3/1998 | Vilmanyi et al. ..................... 408/219 |
| 5,797,710 | * | 8/1998 | Sawabe et al. ....................... 408/222 |

FOREIGN PATENT DOCUMENTS

| | | |
|---|---|---|
| 531510 | * 8/1931 | (DE) ..................................... 470/198 |
| 26 25 863 | 12/1977 | (DE) . |
| 34 19 850 | 11/1985 | (DE) . |
| 295 18 075 | 1/1996 | (DE) . |
| 25 14679 | 4/1983 | (FR) . |
| 60-15623 | 5/1985 | (JP) . |
| 61-144916 U | 9/1986 | (JP) . |
| 2-3325 U | 1/1990 | (JP) . |
| 2-106219 | 4/1990 | (JP) . |
| 3-88627 U | 9/1991 | (JP) . |

\* cited by examiner

*Primary Examiner*—Steven C. Bishop
(74) *Attorney, Agent, or Firm*—Oliff & Berridge, PLC

(57) ABSTRACT

A cold forming tap with an internal finish cutting edge includes an external thread portion having radially outwardly protruding portions and relief portions which are alternately located in a helical direction in which an external thread extends. The protruding portions are forced into a surface of a prepared hole which has been previously formed through a workpiece, for thereby forming an internal thread on the surface. The improvement comprises: at least one of the protruding portions having a root diameter larger than that of the other of the protruding portions, the at least one of the protruding portions being removed down to a root of the external thread, and a flute being formed in a portion corresponding to the root of the at least one of the protruding portions, so as to provide the cutting edge in the portion corresponding to the root.

20 Claims, 10 Drawing Sheets

(Distance Y) > (Distance X)

(Distance Z) > (Distance Y)

COLD FORMING TAP HAVING INTERNAL FINISH CUTTING EDGE AND METHOD OF PRODUCING THE SAME

TECHNICAL FIELD

The present invention relates in general to a cold forming tap for forming an internal thread in a workpiece by plastic deformation of the workpiece. More particularly, the invention is concerned with a cold forming tap which has an internal finish cutting edge and a long life of use and which is capable of efficiently forming an internal thread, even in a hole which has been formed through an aluminum alloy during the casting process.

BACKGROUND ART

There is known a cold forming tap which has an external thread portion including radially outwardly protruding portions and relief portions which are adjacent to and have a diameter smaller than the protruding portions. The protruding portions and the relief portions are alternately located as viewed in a helical direction of the cold forming tap in which a thread extends. The protruding portions are substantially equi-angularly spaced apart from each other as viewed in a circumferential direction of the cold forming tap, while the relief portions are also substantially equi-angularly spaced apart from each other as viewed in the circumferential direction. For forming an internal thread in a prepared hole formed in a workpiece, the protruding portions are forced into a surface of the prepared hole, for plastically deforming the surface so as to form the internal thread on the surface. As one type of the cold forming tap, there is proposed a cold forming tap having an internal finish cutting edge which is provided to finish a minor diameter of the formed internal thread.

This cold forming tap having the internal finish cutting edge is advantageously capable of eliminating a shape of incomplete thread ridge which may possibly appear on a crest of the internal thread, i.e., on the minor diameter of the internal thread. The cold forming tap having the internal finish cutting edge has another advantage of preventing a breakage of the tap due to an excessive torgue acting on the tap, which is caused by a large amount of surplus stock of the workpiece plastically flowing into a limited space, in a case where an internal thread is to be formed in a hole previously formed through the workpiece, which hole has a dimension smaller than a lower limit, such as a tapered hole formed in the workpiece in the casting process. Further, the cold forming tap having the internal finish cutting edge advantageously assures an improved accuracy in the minor diameter of the internal threads.

In the above-described conventional cold forming tap having the internal finish cutting edge, the highest portions of a root diameter of the external thread portion are located at the relief portions adjacent to the protruding portions (lobes) which correspond to the highest portions of a major diameter of the external thread portions, and flutes are formed at the highest portions of the root diameter so that the highest portions of the root diameter constitute the cutting edges.

In general, the external thread portion of the cold forming tap is formed, in a step referred to as a thread grinding, by a grinding wheel having a thread profile formed on an outer circumferential surface thereof such that the thread ridge and the root of the external thread portion are simultaneously formed. In the above-described conventional cold forming tap having the internal finish cutting edge, the crest and the root of the external thread portion have respective concave-convex shapes in the cross section perpendicular to an axial direction of the tap. However, the respective concave-convex shapes of the crest and the crest and a concave-convex shape defined by the root do not coincide with each other as viewed in the circumferential direction of the tap, resulting in a need of grinding the ridge and the root separately from each other. The separate grinding operations not only complicate the production process, but also make it difficult to control the dimensions of the thread ridge. For obtaining high dimensional accuracy of the thread ridge, it would be indispensable to improve the accuracy of the entirety of the external thread portion. Consequently, the conventional cold forming tap has a drawback of requiring a high level of grinding technique and a high cost for the production. The present invention has an object of providing a cold forming tap having an internal finish cutting edge and a method of producing the cold forming tap, wherein the external thread portion can be formed basically in a simple process as known in the art, with easy dimensional control of the thread ridge, at a reduced cost.

DISCLOSURE OF INVENTION

According to a first feature of the present invention, there is provided a cold forming tap with an internal finish cutting edge including an external thread portion in which an external thread having a uniform depth is formed to extend in a helical direction of the cold forming tap, the external thread portion including radially outwardly protruding portions and relief portions which are adjacent to and have a diameter smaller than the protruding portions, the protruding portions and the relief portions being alternately located in the helical direction, such that the protruding portions are angularly spaced apart from each other at a predetermined angular interval in a circumferential direction of the cold forming tap, and such that the relief portions are angularly spaced apart from each other at a predetermined angular interval in the circumferential direction, the protruding portions being forced into a surface of a prepared hole which has been formed in a workpiece, for plastically deforming the workpiece whereby an internal thread is formed on the surface, the cold forming tap being characterized in that at least one of the protruding portions which are located within each lead of the external thread portion has a root diameter larger than that of the other of the protruding portions, the at least one of the protruding portions being removed down to a root of the external thread, and a flute is formed in a portion corresponding to the root of the at least one of the protruding portions, so as to provide the internal finish cutting edge in the portion corresponding to the root.

According to this arrangement, the at least one of the protruding portions which are located within each lead of the external thread portion is removed down to the root whereby the cutting edge is formed at the portion corresponding to the root in the removed protruding portion. The cutting edge serves to remove surplus stock which has been displaced inwardly from the root diameter of the external thread portion as a result of the plastic deformation of the surface of the prepared hole caused by a bite by a thread ridge of the external thread portion into the surface, permitting easy formation of the internal thread with desired accuracy. Further, according to the construction of the cold forming tap having the internal finish cutting edge of the present invention, a maximum diameter position of the root is not located at each of the relief portions which are adjacent to the protruding portions of the external thread portion, and the concave-convex shape defined by the crest and the concave-convex shape defined by the root coincide with each other as viewed in the circumferential direction of the tap. This coincidence between the respective concave-convex shapes makes it possible to form simultaneously the ridge and root of the external thread portion with high accuracy, by employing a grinding wheel having a thread profile formed on its outer circumferential surface in a step referred to as a thread grinding, considerably facilitating the dimensional control of the thread of the external thread portion, and leading to a reduced cost for the production.

In the cold forming tap described above, the external thread portion preferably includes a tapered leading portion and a full-form thread portion which is adjacent to one of opposite ends of the tapered leading portion that is nearer to a proximal end of the cold forming tap, the tapered leading portion having an outside diameter decreasing in a direction toward the free end, while the full-form thread portion having a constant outside diameter, the cutting edge in the full-form thread portion having a diameter equal to the minor diameter of the internal thread. According to this arrangement, the cutting edge removes the surplus stock which has been displaced inwardly from the root diameter of the external thread portion as a result of the plastic deformation of the surface of the prepared hole caused by the bite of a thread ridge of the external thread portion into the surface, leading to a formation of the internal thread having a high precision.

Further, every predetermined number of the above-described protruding portions is removed down to the root, the predetermined number being equal to a number which is a divisor of the number of the protruding portions per lead of the external thread and which is other than "one". This arrangement permits the above-described at least one of the protruding portions which is removed down to the root, to be located adjacently to each other as viewed in an axial direction of the cold forming tap.

Further, the flute is formed in a portion corresponding to the root of the above-described at least one of the protruding portions, so as to provide the internal finish cutting edge in the portion corresponding to the root, and a plurality of the protruding portions are located on a rear side of the cutting edge as viewed in a rotating direction of the cold forming tap, the plurality of protruding portions having different heights such that the height of a rear side one of the adjacent two protruding portions as viewed in the rotating direction is larger than that of the other of the adjacent two protruding portions which is located on a forward side of the rear side one as viewed in the rotating direction. This arrangement permits all of the protruding portions to be uniformly loaded with the plastic deformation resistance, and is effective to suitably prevent the protruding portions from being broken, leading to improved durability of the cold forming tap.

Further, the protruding portions which have been removed down to the root and which are adjacent to each other in the axial direction are preferably formed over an entire axial length of the external thread portion. Further, the above-described flute is preferably formed over an entire axial length of the tapered leading portion. According to this arrangement, the surplus stock which has moved inside the cutting edge is removed by the cutting edge at the tapered leading portion which receives a larger cold forming load than the other portions of the tap, providing an advantage that the torque acting on the tap is further reduced.

Further, the above-described flute is preferably formed over an entire axial length of the tapered leading portion and a portion of the full-form thread portion which is adjacent to the tapered leading portion.

Further, the flute is preferably formed over a portion of the full-form thread portion which is adjacent to the tapered leading portion and a portion of the tapered leading portion which is adjacent to the full-form thread portion.

Further, the above-described at least one of protruding portions at the tapered leading portion is preferably removed down to the root along a plane which is inclined with respect to an axis of the cold forming tap by an angle substantially equal to a half of a taper angle of the tapered leading portion, and a flute is formed in a portion corresponding to the root of the at least one of the protruding portions in the tapered leading portion, so as to provide a cutting edge in the portion corresponding to the root of the at least one of the protruding portions in the tapered leading portion. This arrangement permits the cutting edge to remove the surplus stock reaching the root of the thread in the tapered leading portion which receives the larger cold forming load than the other portions of the tap, and is effective to reduce the torque acting on the tap and suitably prevent a breakage of the tap even in a case where an internal thread is formed in a small hole, e.g., a tapered holed formed through the workpiece in the casting process.

Further, the tapered leading portion preferably has an oil groove formed therein, such that the oil groove is adjacent to the flute and extends up to a free end of the tapered leading portion. Further, the oil groove is preferably formed in a plane which is inclined with respect to an axis by an angle substantially equal to a half of a taper angle of the tapered leading portion. These arrangements permit a cutting lubricant to be suitably applied to the entire axial length of the tapered leading portion which is more subject to the cold forming load, even where the flute does not extend over the entire axial length of the tapered leading portion due to a small depth of the flute.

Further, preferably, the cold forming tap further includes an oil groove which is formed over an entire axial length of the external thread portion.

Further, preferably, the flute and the at least one of the protruding portions which has been removed down to the root are formed to extend linearly or helically in a direction parallel to the axis of the cold forming tap.

Further, the external thread portion preferably has a polygonal shape defined by sides each of which is outwardly arched. Further, the external thread portion preferably has a substantially square cross sectional shape defined by four sides each of which is outwardly arched. Further, the external thread portion preferably has a substantially hexagonal cross sectional shape defined by six sides each of which is outwardly arched. Further, the external thread portion preferably has a substantially triangular cross sectional shape defined by three sides each of which is outwardly arched.

Further, at least the protruding portions and a portion of the cutting edge which are located in the tapered leading portion are preferably constituted by a cemented carbide which is bonded on a circumferential portion of a body of the cold forming tap which is made of an alloy steel. According to the this arrangement, the protruding portions and the cutting edges which receive a larger friction load than the other portions of the tap are constituted by a wear-resistant material such as cemented carbide or an extra-high-pressure sintered body, assuring excellent precision of the cold forming thread for a long time and preventing a breakage of the tap more effectively than where the entirety of the tap is made of cemented carbide.

The above-indicated object may also be achieved according to a second feature of the present invention, which provides a method of producing a cold forming tap with an internal finish cutting edge including an external thread portion in which an external thread is formed to extend in a predetermined helical direction of the cold forming tap, the external thread portion including radially outwardly protruding portions and relief portions which are adjacent to and have a diameter smaller than the protruding portions, the protruding portions and the relief portions being alternately located in the helical direction, such that the protruding portions are angularly spaced apart from each other at a predetermined angular interval in a circumferential direction of the cold forming tap, and such that the relief portions are angularly spaced apart from each other at a predetermined angular interval in the circumferential directional, the protruding portions being forced into a surface of a prepared hole which has been previously formed in a workpiece, for plastically deforming the workpiece whereby an internal thread is formed on the surface, the method being characterized by including: (a) a thread grinding step of grinding an outer circumferential surface of one of opposite end portions of a bar-like blank by employing a grinding wheel having an outer circumferential surface on which a thread profile is formed, for forming the external thread having a uniform distance between a crest and a root of the external thread, such that at least one of the protruding portions which are located within each lead of the external thread portion has a root diameter larger than that of the other of the protruding portions, the thread profile having a distance between a crest and a root of the thread profile which distance is equal to the above-indicated uniform distance; (b) a protruding-portion removing step of removing the at least one of the protruding portions which have been formed in the thread-grinding step, down to the root of the external thread; and (c) a flute forming step of forming a flute in a surface which has been obtained as a result of removing each of the at least one of the protruding portions in the protruding-portion removing step, so that a cutting edge is provided on a forward side of a line as viewed in a rotating direction of the cold forming tap, the line representing a minimum diameter position lying on the surface obtained in the protruding-portion removing step.

As described above, the cold forming tap having the internal finish cutting edge of the present invention is produced as follows: The thread grinding step is first implemented to form the external thread having the uniform distance between the crest and the root, such that at least one of the protruding portions which are located within each lead of the external thread portion has the root diameter larger than that of the other of the protruding portions. The thread grinding step is followed by the protruding-portion removing step to remove the above-described at least one of the protruding portions, down to the root. The flute forming step is then implemented to form the flute in the surface which has been obtained as a result of removing each of the protruding portions, so that the cutting edge is provided on the forward side of the line representing the minimum diameter position on the above-indicated surface. According to the present method, it is possible to form simultaneously the ridge and the root of the external thread portion with high precision, considerably facilitating the dimensional control of the thread of the external thread portion, and reducing the cost for the production.

BEST MODE FOR CARRYING OUT THE INVENTION

Some embodiments of the present invention will be described in detail on the basis of the drawings.

Figure 1:
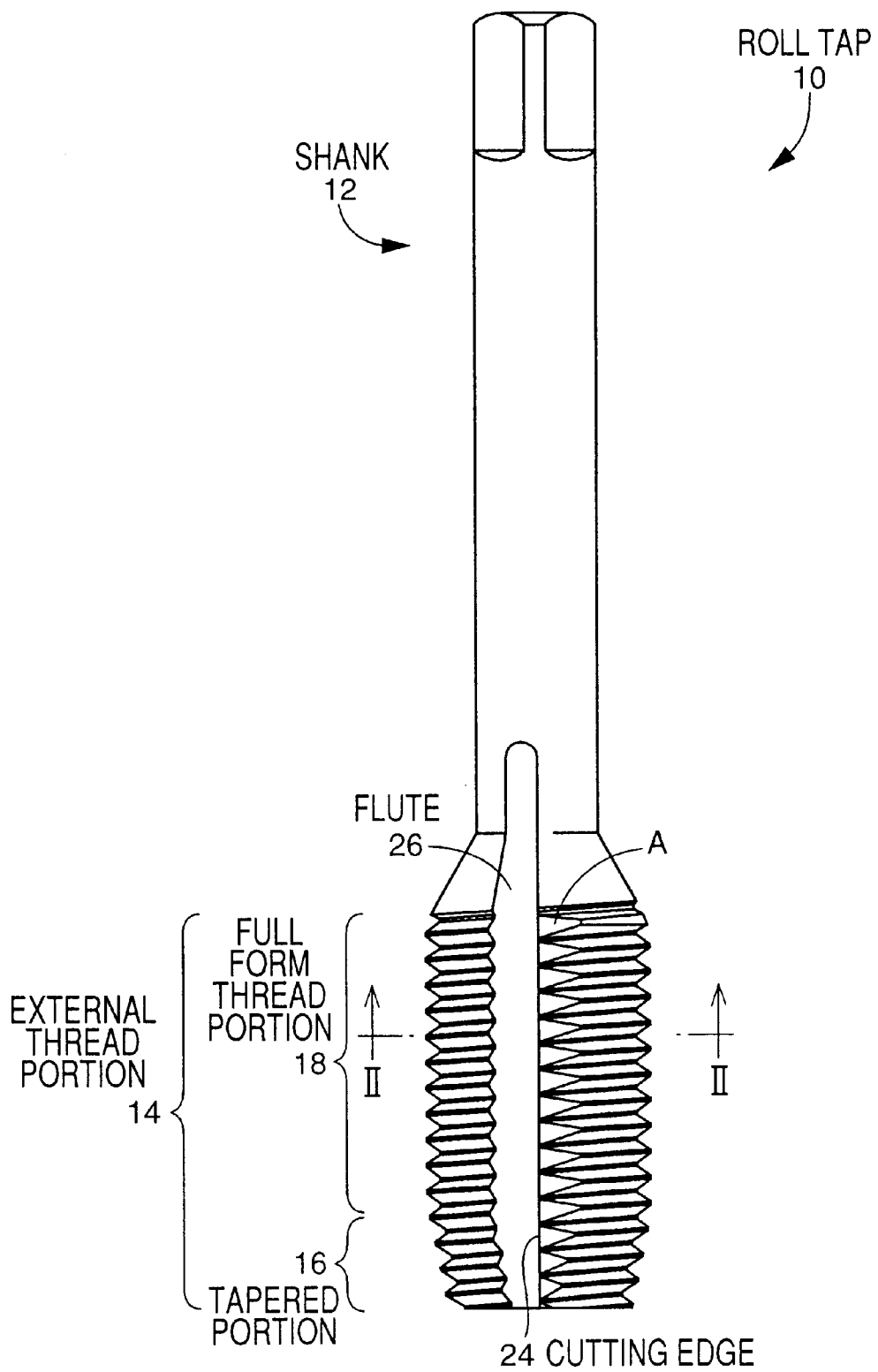
FIG. 1 is a front view showing a cold forming tap of one embodiment of the present invention.
Figure 2:
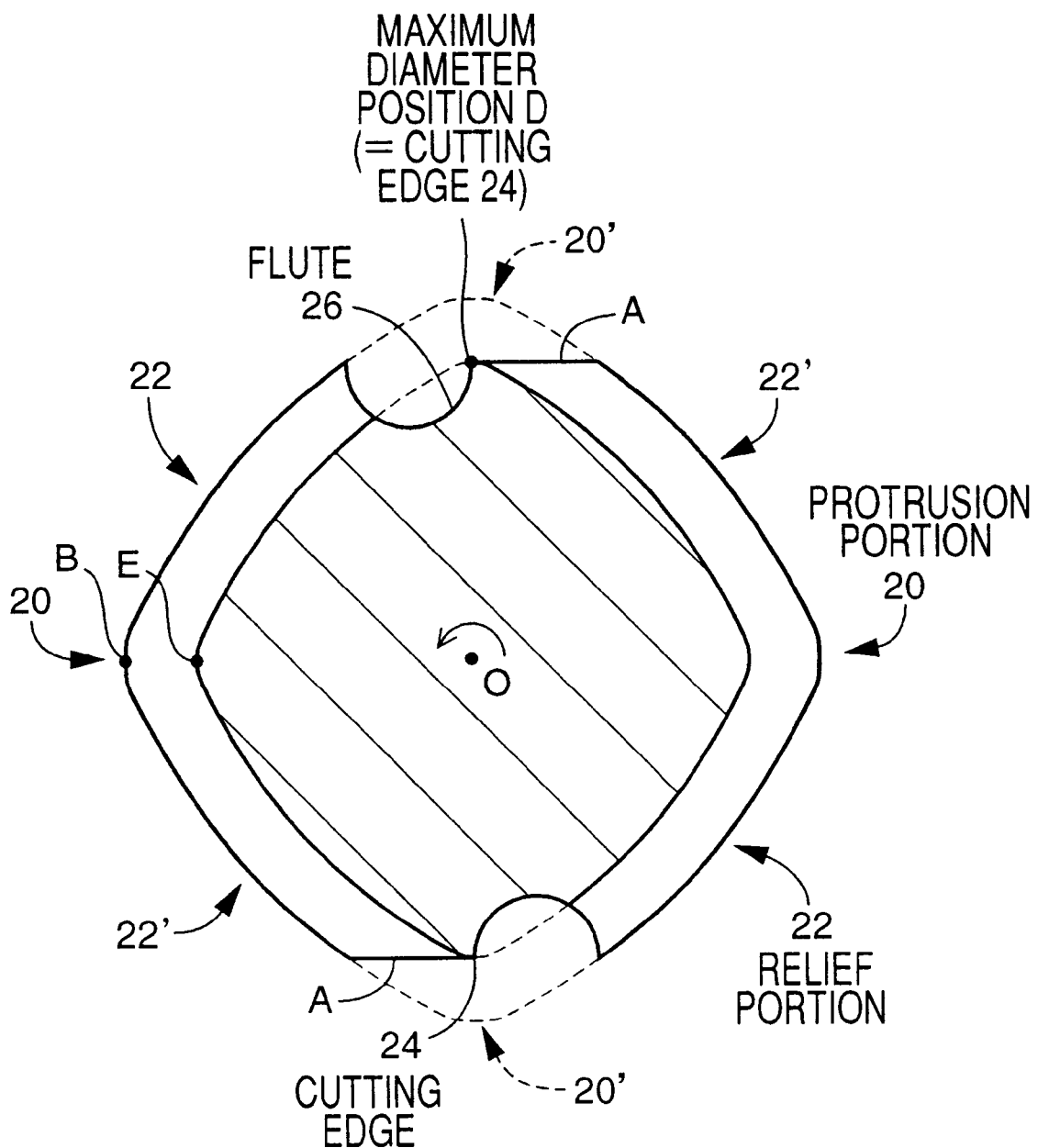
FIG. 2 is a view in cross section showing in enlargement an external thread portion in the embodiment of FIG. 1, and also showing the production process for producing the cold forming tap of the embodiment of FIG. 1, particularly, a flute forming step.

FIG. 1 is a front view showing a cold forming tap having internal finish cutting edges (hereinafter referred to as a cold forming tap) 10 according to one embodiment of the present invention. FIG. 2 is a cross-sectional view taken along line II—II of FIG. 1. This cross-sectional view is taken along a thread root of the cold forming tap, in the interest of easy understanding of the figure. The cold forming tap 10 has a shank 12 at a proximal end portion thereof and an external thread portion 14 at a free end portion thereof. The cold forming tap 10 is held at the proximal end portion by a chucking device not shown in the figure. The external thread portion 14 is provided to form an internal thread in a workpiece.

The external thread portion 14 consists of a tapered leading portion 16 and a full-form thread portion 18 that is adjacent to one of opposite ends of the tapered leading portion 16 which is closer to the above-described proximal end portion. The tapered leading portion 16 has an outside diameter decreasing as viewed in a direction toward the free end portion, while the full-form thread portion 18 has a constant outside diameter. The full-form thread portion 18 has a thread ridge and a root whose shapes substantially correspond to those of a thread ridge and a root of an internal thread which is to be formed on a surface of a prepared hole of the workpiece not shown in the figure. During the tapping process, the full-form thread portion 16 generates a drive force in a direction in which the tap 10 is screwed, for finishing a surface of the internal thread.

The external thread portion 14 has in its cross section a polygonal shape defined by sides each of which is outwardly arched. According to the present embodiment, the external thread portion 14 has in its cross section a substantially rectangular shape defined by four sides each of which is outwardly arched. In the external thread portion 14, a thread is formed to extend along a helix having a predetermined lead angle such that a height of a crest of the thread from a root of the thread is constant. The thread of the external thread portion 14 has in a cross section thereof four protruding portions 20, 20' which radially outwardly protrude, and relief portions 22, 22' which are adjacent to the protruding portions 20, 20' and which cooperate with each other to define a comparatively small diameter. That is, the protruding portions 20, 20' and the comparatively low relief portions 22, 22' are alternately located in a helical direction of the tap 10 in which the thread extends, i.e., along the above-indicated helix. The protruding portions 20, 20' are equi-angularly spaced apart from each other at a predetermined angular interval in a circumferential direction of the tap 10, while the relief portions 22, 22' are also equi-angularly spaced apart from each other at a predetermined angular interval in the circumferential direction. In the present embodiment, the protruding portions 20, 20' are spaced apart from each other at the angular interval of 90°, while the relief portions 22, 22' are also spaced apart from each other at the angular interval of 90°. Since the protruding portions 20, 20' are equi-angularly spaced from each other at the angular interval of 90° in the helical direction, each pair of the protruding portions 20, 20' which are located adjacent to each other in the axial direction of the external thread portion 14 are spaced apart from each other in the axial direction by a distance equal to the lead (one revolution) of the helix, as shown in FIG. 1.

The protruding portions 20' which are the ones of the plurality of protruding portions 20, 20' formed along the above-indicated helix and which are adjacent to each other in the axial direction of the external thread portion 14, are removed down to the root of the thread, by surface grinding. That is, every predetermined number of the protruding portions 20, 20' is removed down to the root, provided the predetermined number is equal to a number which is a divisor of the number of the protruding portions 20, 20' per lead of the helix and which is other than "one" (In the present embodiment, the predetermined number is "two", so that every second of the protruding portions 20, 20' is removed down to the root). The surface grinding provides a ground surface A which is tangent to a maximum diameter position D lying on the root at the corresponding protruding portion 20' and which is perpendicular to a radius OD connecting the maximum diameter position D and a rotational center O, in the cross section of the full-form thread portion 18 as shown in FIG. 2.

On the ground surface A formed by grinding off the protruding portion 20', there is formed a flute 26 extending parallel to the axis of the cold forming tap 10 and having in its cross section a semi-circular shape, so as to form a cutting edge 24 at the maximum diameter position D corresponding to the root. The cutting edge 24 serves to finish the minor diameter of the internal thread to be formed. The protruding portions 20 which are not removed cooperate with each other to define an outside diameter smaller than that of the removed protruding portions 20'. In the present embodiment, there are the following predetermined relationships in diametrical dimensions regarding the rotational center O of the cold forming tap 10, a maximum diameter position B of the protruding portions 20 and a root position E of the protruding portions 20.

The thread at the full-form thread portion 18, which is formed in a single thread grinding step, has a constant depth. Further, the thread is formed in the thread grinding step such that a crest diameter (2×OB) of the non-removed protruding portions 20 is equal to a root diameter of the internal thread to be formed, and such that a root diameter (2×OD) of the protruding portions 20' is equal to a minor diameter (crest diameter) of the internal threads to be formed. Accordingly, the crest diameter of the non-removed protruding portions 20 is smaller than a crest diameter of the removed protruding portions 20', and a root diameter (2×OE) of the non-removed protruding portions 20 is smaller than the root diameter (2×OD) of the removed protruding portions 20'. The cutting edge 24 is defined by the flute 26, and is formed at a minimum diameter position on the ground surface A, which minimum diameter position corresponds to the root diameter (2×OD) of the protruding portions 20'. Thus, the diameter of a rotary locus of the cutting edge 24, i.e., the root diameter (2×OD) of the protruding portions 20' is made equal to the minor diameter of the internal thread to be formed.

Figure 3:
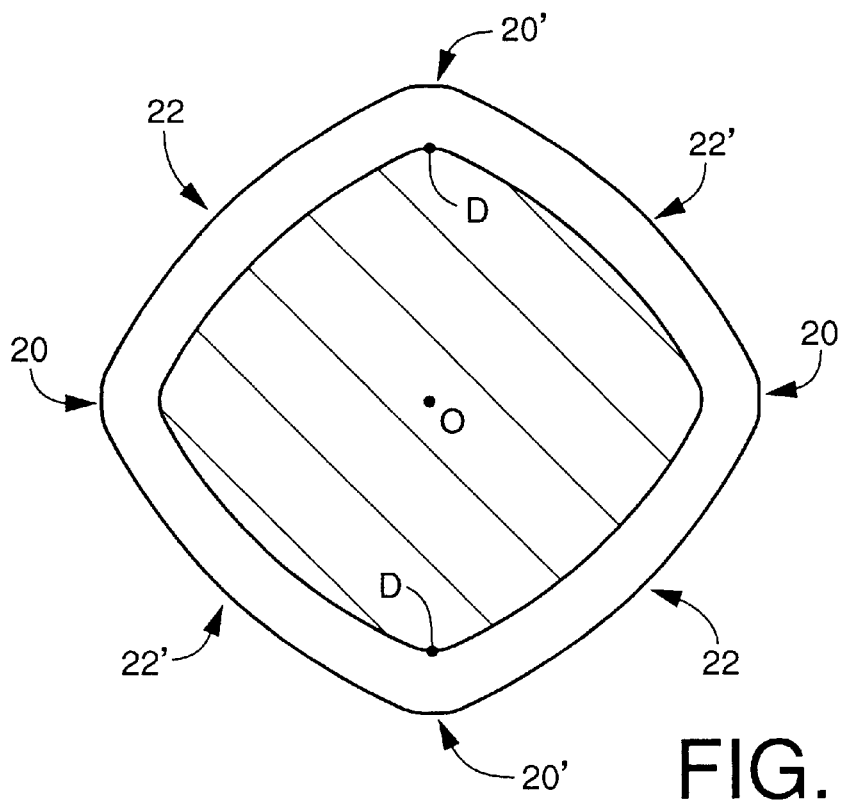
FIG. 3 is a view showing the production process for producing the cold forming tap of the embodiment of FIG. 1, after a thread ridge has been completed in a thread grinding step.

There will be described a method of producing the cold forming tap 10 constructed as described above. Firstly, in the thread grinding step, a grinding wheel having a thread profile formed on an outer circumferential surface thereof is employed to form a thread on an outer circumferential surface of a bar-like blank which is made of a comparatively highly durable metallic material such as tool steel, high-speed steel or alloy steel and which has been cut to have a predetermined length. As a result of the thread grinding step, the external thread portion 14 having in its cross section a substantially rectangular shape defined by four sides each of which is outwardly arched, is formed at the free end portion of the bar-like blank, as shown in FIG. 3, and the thread of the external thread portion 14 which extends along a helix having a predetermined lead angle is provided with the four radially outwardly protruding portions 20, 20' and the relief portions 22, 22' which are adjacent to and have a diameter smaller than the protruding portions 20, 20'. The depth of the above-indicated thread of the external thread portion 14 is equal to that of the thread profile formed on the outer circumferential surface of the grinding wheel, and is constant at least at the full-form thread portion 18.

In this thread grinding step, the bar-like blank is positioned at four different positions which are angularly spaced apart from each other at the angular interval of 90° in the circumferential direction of the bar-like blank, and is held at the respective positions. At each one of the positions, the outer circumferential surface of the bar-like blank is ground by the rotating grinding wheel while the bar-like blank is moved along an arc whose center is located at a center of curvature of the corresponding one of the four sides, for thereby forming the thread of the cold forming tap 10, such that the root diameter (2×OD) of the protruding portions 20' is equal to the minor diameter (crest diameter) of the internal thread to be formed, and such that the crest diameter (2×OB) of the protruding portions 20 is equal to the root diameter of the internal thread to be formed.

Figure 4:
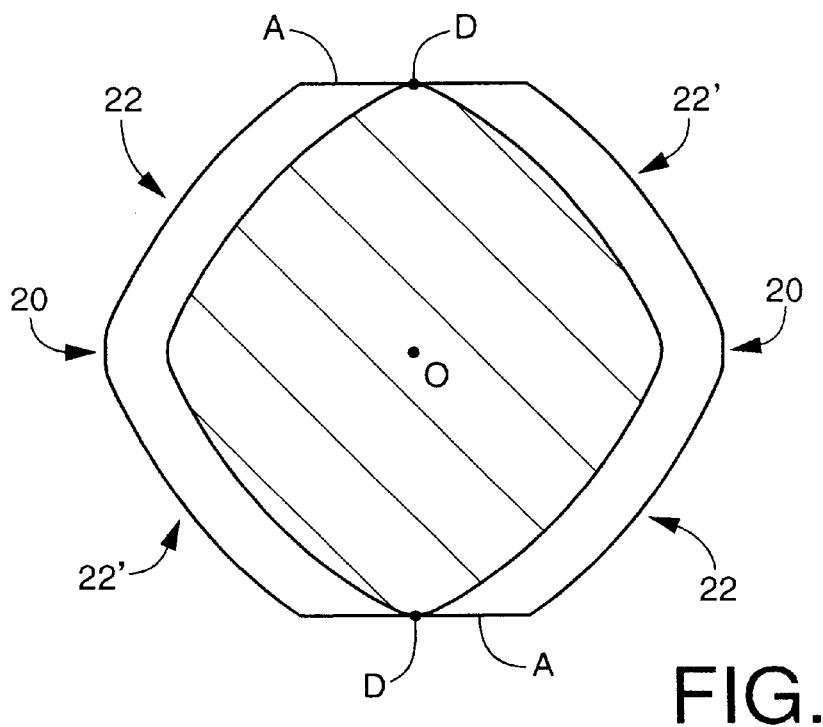
FIG. 4 is a view showing the production process for producing the cold forming tap of the embodiment of FIG. 1, after ground surfaces A are formed in a protruding-portion removing step.

Next, in a protruding-portion removing step, the protruding portions 20' which correspond to every two protruding portions 20, 20' successively arranged adjacent to each other in the helical direction is removed down to the root, by grinding the protruding portions 20' in a direction in which the every two protruding portions 20' is adjacent to each other at an interval of one lead of the thread, i.e., in the direction parallel to the axis of the cold forming tap 10, in the present embodiment. This protruding-portion removing step provides the ground surfaces A as shown in FIG. 4.

Then, in a flute forming step, the flute 26 is formed by grinding, on the forward side, as viewed in the rotating direction of the cold forming tap 10, of a line indicative of the minimum diameter position of each of the ground surfaces A, as shown in FIG. 2. The flute 26 defines the cutting edge 24 which extends along the above-indicated line. In this flute forming step, a grinding wheel whose outer circumferential grinding surface has a cross sectional shape substantially identical with a cross sectional shape of the flute 26.

Figure 5:
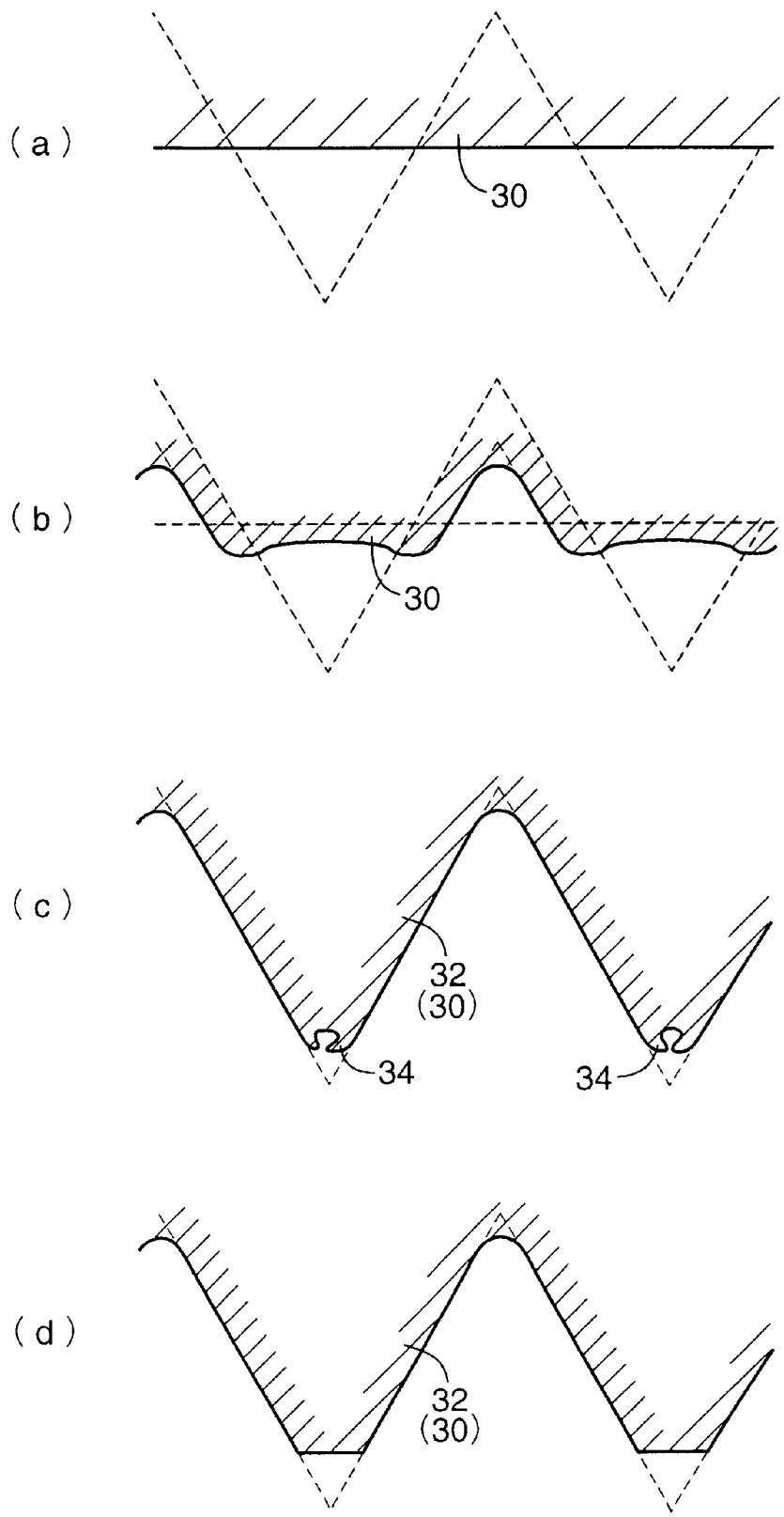
FIG. 5 is a view showing a process in which an internal thread is formed by the cold forming tap of the embodiment of FIG. 1.

FIG. 5 shows a process in which the internal thread is formed by using the cold forming tap 10 of the present embodiment constructed as described above. In the process, a high-precision internal thread 32 is formed on the surface of the hole previously formed in the workpiece 30. That is, the tapered leading portion 16 of the cold forming tap 10 is first screwed into the hole and forced into the surface of the prepared hole shown in FIG. 5(a), and the surface of the hole begins to be plastically deformed as shown in FIG. 5(b). As the full-form thread portion 18 is screwed into the hole following the tapered leading portion 16, the surface of the prepared hole is further plastically deformed, whereby surplus stock 34 of the workpiece appears on the crest of the formed internal thread 32 and extends inwardly in the radial direction of the hole, as shown in FIG. 5(c). The surplus stock 34 is removed by the cutting edge 24 passing the crest of the internal thread 32 as shown in FIG. 5(d). Therefore, the cold forming tap 10 is capable of forming the internal thread 32 with high precision in its minor diameter, even where the hole is a tapered hole which has been formed through a member made of a die-cast light alloy known as AC2C, for example, during the casting process and whose dimension is difficult to control. For example, the above-indicated tapered hole has a diameter of 11.30 mm at an entrance end thereof and a diameter of 10.80 mm at an exit end thereof which is 18 mm distant from the entrance end, while a normally recommended range of the diameter of the prepared hole for forming an internal thread of class 6H is 11.34–11.41 mm.

As described above, the cold forming tap 10 is constructed such that the protruding portions 20' of the protruding portions 20, 20', which are adjacent to each other in the axial direction are removed down to the root, and the cutting edge 24 having a diameter equal to the minor diameter of the internal thread 32 to be formed is formed at the portion corresponding to the root of each removed protruding portion 20'. Accordingly, the cutting edge 24 serves to remove the surplus stock 34, which has been displaced inwardly from a maximum root diameter of the external thread portion 14 as a result of the plastic deformation caused by the bite of the external thread portion 14 into the surface of the prepared hole, resulting in the formation of the high-precision internal thread 32. Further, the removal of the surplus stock 34 by the cutting edge 24 is effective to reduce a cold forming load acting on the tap 10, suitably preventing the tap 10 from being broken due to an excessive torque, even where the prepared hole has an inside diameter smaller than the lower limit.

According to the construction of the cold forming tap having the internal finish cutting edges 10 of the present embodiment, the maximum diameter position of the root is not located at the relief portions 22, 22' which are adjacent to the protruding portions 20, 20' of the external thread portion 14, and a concave-convex shape defined by the crest and crest and the root of the external thread portion have respective concave-convex shapes in the cross section perpendicular to an axial direction of the tap which shapes coincide with each other as viewed in the circumferential direction of the cold forming tap 10 shown in FIG. 2. This coincidence between the respective concave-convex shapes makes it possible to form simultaneously the ridge and root of the external thread portion 14 by the grinding wheel having a thread profile formed on its outer circumferential surface in a step referred to as a thread grinding, with high precision and efficiency, facilitating a dimensional control of the external thread portion 14, whereby the cold forming tap 10 having a high precision can be easily and inexpensively produced.

Figure 6:
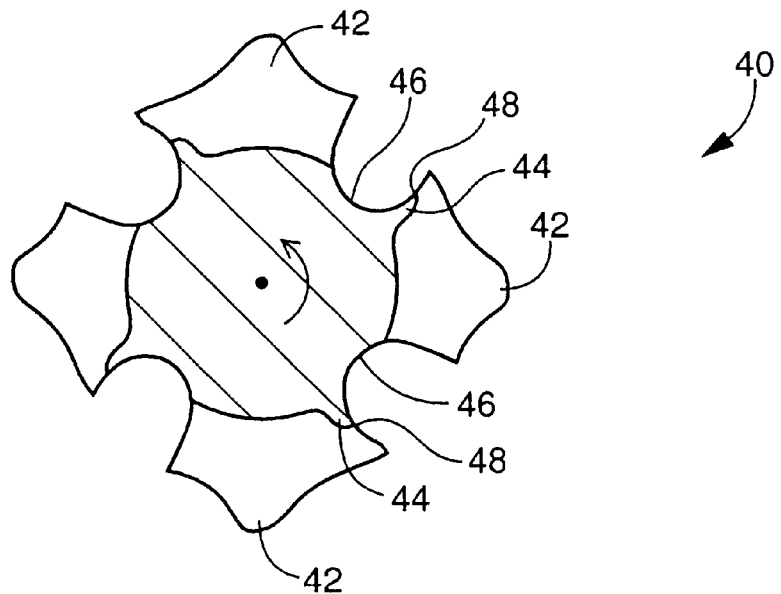
FIG. 6 is a cross sectional view showing an external thread portion of a conventional cold forming tap having internal finish cutting edges.

FIG. 6 is a cross sectional view showing an external thread portion of a conventional cold forming tap 40 having internal finish cutting edges. As shown in the figure, protruding portions 42 are formed at the ridge of the external thread portion, and protruding portions 44 are formed at the root of the external thread portion, respectively. Further, a flute 46 is formed between each two of the protruding portions 42 which is adjacent to each other, whereby cutting edges 48 cooperating with each other to have the maximum root diameter are formed at the respective protruding portions 44 formed at the root. Accordingly, a concave-convex shape defined by the crest and a concave-convex shape defined by the root do not coincide with each other as viewed in the circumferential direction of the cold forming tap 40. This means that the thread of the external thread portion can not be formed in a single thread grinding step in which the thread is formed by a grinding wheel having a thread profile formed on an outer circumferential surface thereof. Instead, the formation of the external thread portion requires a plurality of different thread grinding steps so that the ridge and root are formed separately from each other in the respective different steps. The separate grinding operations not only complicate the production process, but also make it difficult to control the dimensions of the thread. For obtaining high dimensional accuracy of the thread, it is indispensable to improve the accuracy of the entirety of the external thread portion. Consequently, the conventional cold forming tap has a drawback of requiring a high level of grinding technique and a high cost for the production.

There will be described some other embodiments of the present invention. The same reference numerals as used in the above-described embodiment will be used to identify the identical elements, and description of theses elements will not be provided.

Figure 7:
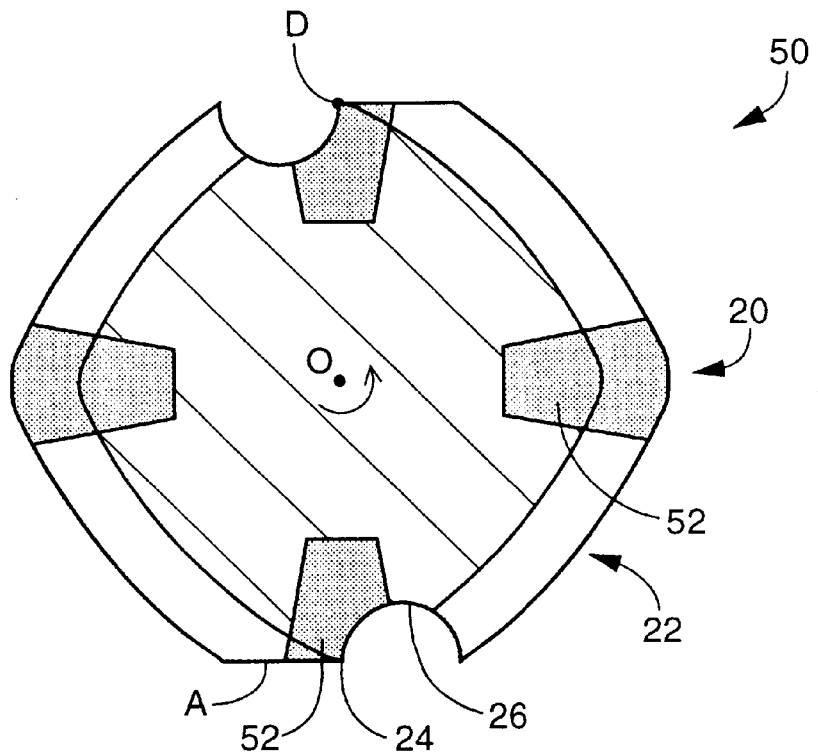
FIG. 7. is a view corresponding to FIG. 2, which shows another embodiment of the present invention.
Figure 8:
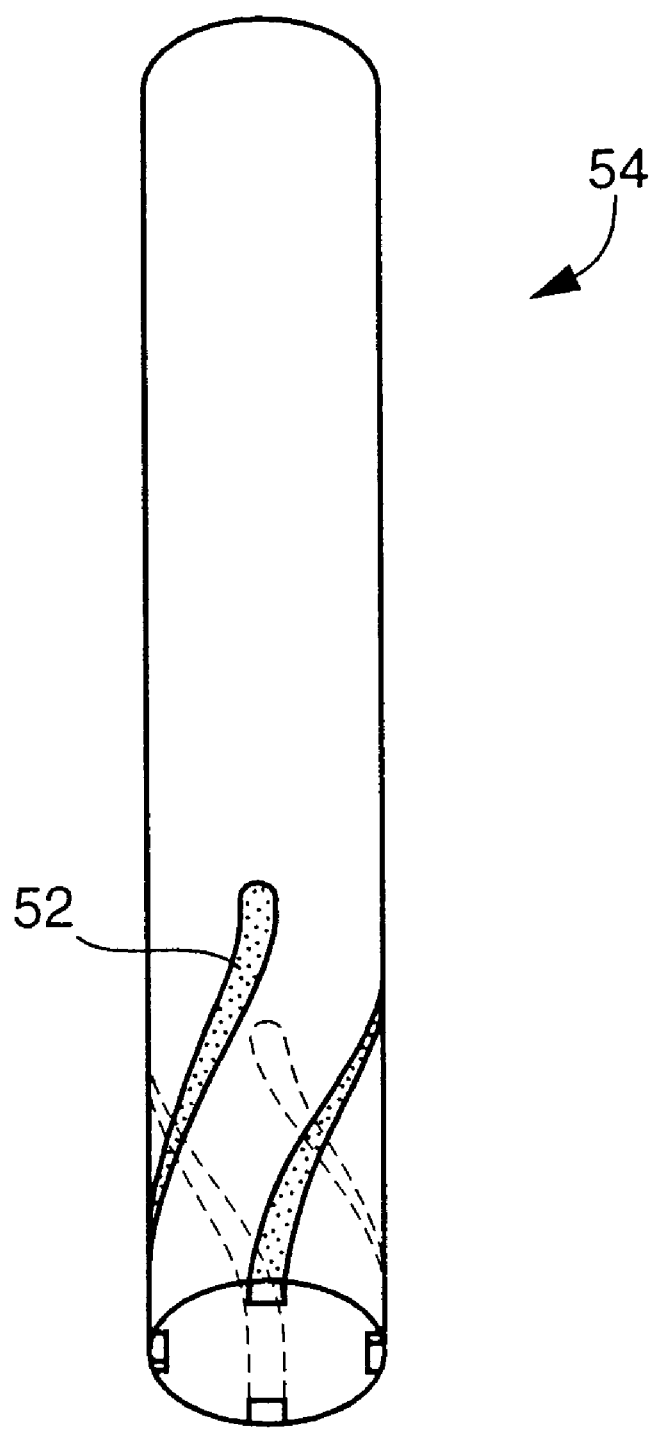
FIG. 8 is a perspective view showing a blank employed for the cold forming tap of the embodiment of FIG. 7.

FIG. 7 is a cross sectional view showing an external thread portion of a cold forming tap 50 according to another embodiment of the present invention. In the figure, each of portions corresponding to the protruding portions 20 has a wear-resistant material 52, such as cemented carbide or an extra-high-pressure sintered body, which is embedded and cemented in the portion. Such a material serves to improve the durability of the protruding portions 20 and cutting edges 24 which receive a large cold forming load. The cold forming tap 50 of the present embodiment may be made of tool steel, high-speed steel or alloy steel, as a bar-like blank 54 which has been cut to have a predetermined length as shown in FIG. 8. A plurality of strips of the wear-resistant material 52 are first embedded in the outer circumferential surface of the bar-like blank 54, so as to spirally extend. In the thread grinding step, the protruding portions 20, 20' are formed at the portions at which the strips of the wear-resistant material 52 are embedded, whereby each pair of the protruding portions 20, 20' which are spaced apart from each other by a distance equal to the lead are spirally adjacent to each other in the axial direction, while the ground surfaces A and the flutes 26 are also formed to spirally extend. In the present embodiment, the protruding portions 20 and the cutting edges 24 which receive a larger friction load than the other parts of the tap 50 are constituted by the wear-resistant material 52 such as cemented carbide, assuring excellent precision of the formed thread for a long period while preventing a breakage of the tap more effectively than where the entirety of the tap is made of cemented carbide.

Figure 9:
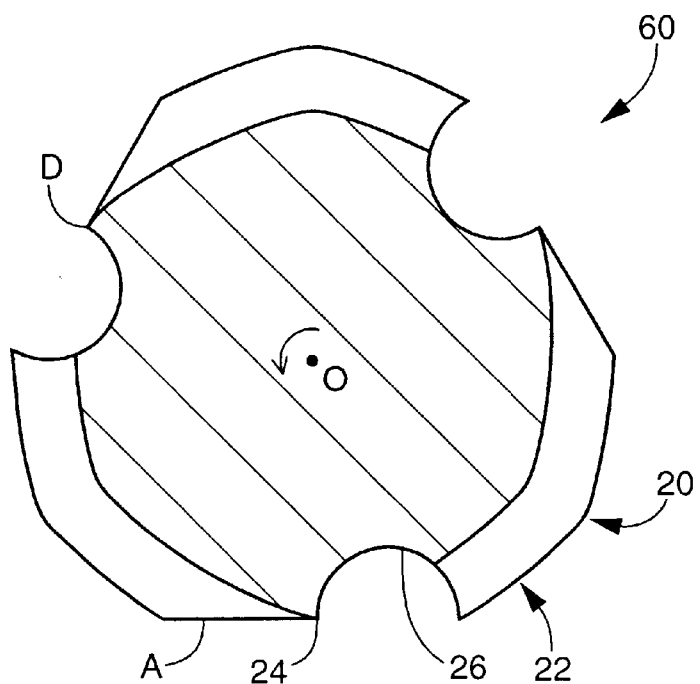
FIG. 9 is a view corresponding to FIG. 2, which shows a further embodiment of the present invention.

FIG. 9 shows a cross section of an external thread portion of a cold forming tap 60 according to a further embodiment of this invention. As shown in the figure, the external thread portion has a substantially hexagonal cross sectional shape defined by six sides each of which is outwardly arched, wherein the protruding portions 20 are equi-angularly spaced apart from each other at the angular interval of 60°. As in the above-described embodiment shown in FIG. 2, the protruding portions 20' each of which corresponds to every second of the protruding portions 20, 20' formed along the helix are removed, and the flutes 26 are formed such that the portions corresponding to the root of the protruding portions 20', i.e., the maximum diameter positions of the root diameter constitute the cutting edges 24.

Figure 10:
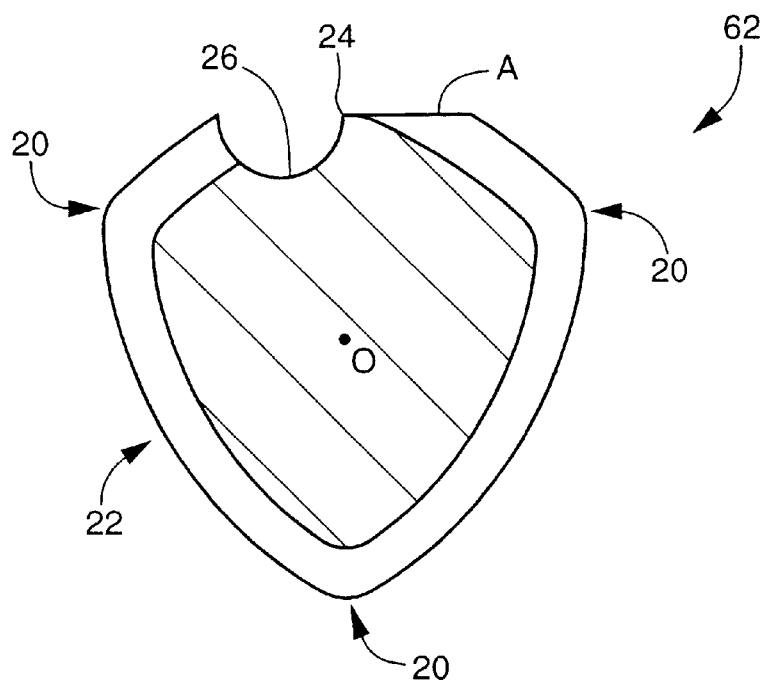
FIG. 10 is a view corresponding to FIG. 2, which shows a further embodiment of the present invention.

FIG. 10 shows a cross section of an external thread portion of a cold forming tap 62 according to a still further embodiment of this invention. As shown in the figure, the protruding portions 20 are equi-angularly spaced apart from each other at the angular interval of 120° in a circumferential direction of the tap 62. The protruding portion 20' is formed between a pair of the protruding portions 20, and the protruding portion 20' is removed down to the root. Further, the flute 26 is formed such that the portion corresponding to the root of the protruding portion 20', i.e., the maximum diameter position of the root diameter constitutes the cutting edge 24.

Figure 11:
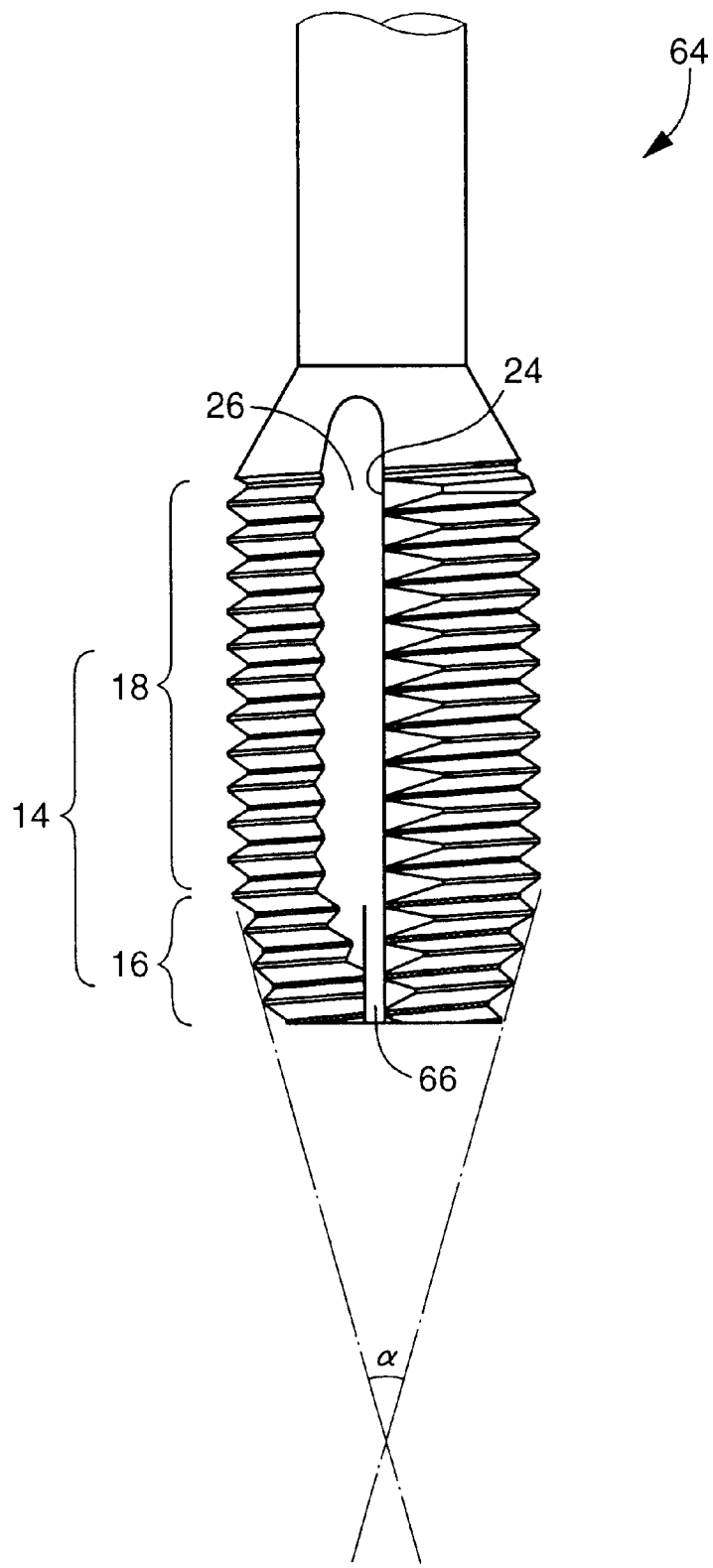
FIG. 11 is a view corresponding to FIG. 1, which shows a further embodiment of the present invention.

FIG. 11 is a view in enlargement showing an essential portion of a cold forming tap 64 according to a still further embodiment of this invention. As shown in the figure, the flute 26 is formed to extend in the axial direction of the tap 64 throughout the full-form thread portion 18 and a portion of the tapered leading portion 16 which is adjacent to the full-form thread portion 18. That is, the flute 26 extends up to a terminal end thereof which is located at the tapered leading portion 16. The flute 26 is thus formed, due to the following two reasons in the present embodiment. Namely, the depth of the flute 26 is smaller than that in the embodiment shown in FIG. 1, and the taper angle of the tapered leading portion 16 is larger than that in the embodiment shown in FIG. 1. Even with only one of the above two reasons, the flute 26 will be formed as described above. In the present embodiment, there is an oil groove 66 which is formed to extend from the above-indicated terminal end of the flute 26 to the free end of the tapered leading portion 16. The oil groove 66 has a width smaller than that of the flute 26, and has a rectangular shape in cross section. The oil groove 66 is preferably formed so as to extend in a direction which is inclined with respect to the axis of the tap 64, by an angle substantially equal to a half of the taper angle α of the tapered leading portion 16, i.e., by an angle defined by right and left straight lines extending along the tapered leading portion 16 and intersecting each other as shown in FIG. 11. The present embodiment is advantageously capable of applying a lubricant oil to the internal thread which is being formed, owing to the provision of the oil groove 66 serving to communicate the terminal end of the flute 26 and the free end of the tapered leading portion 16, although the flute 26 does not extend throughout the external thread portion 14 in the axial direction.

Figure 12:
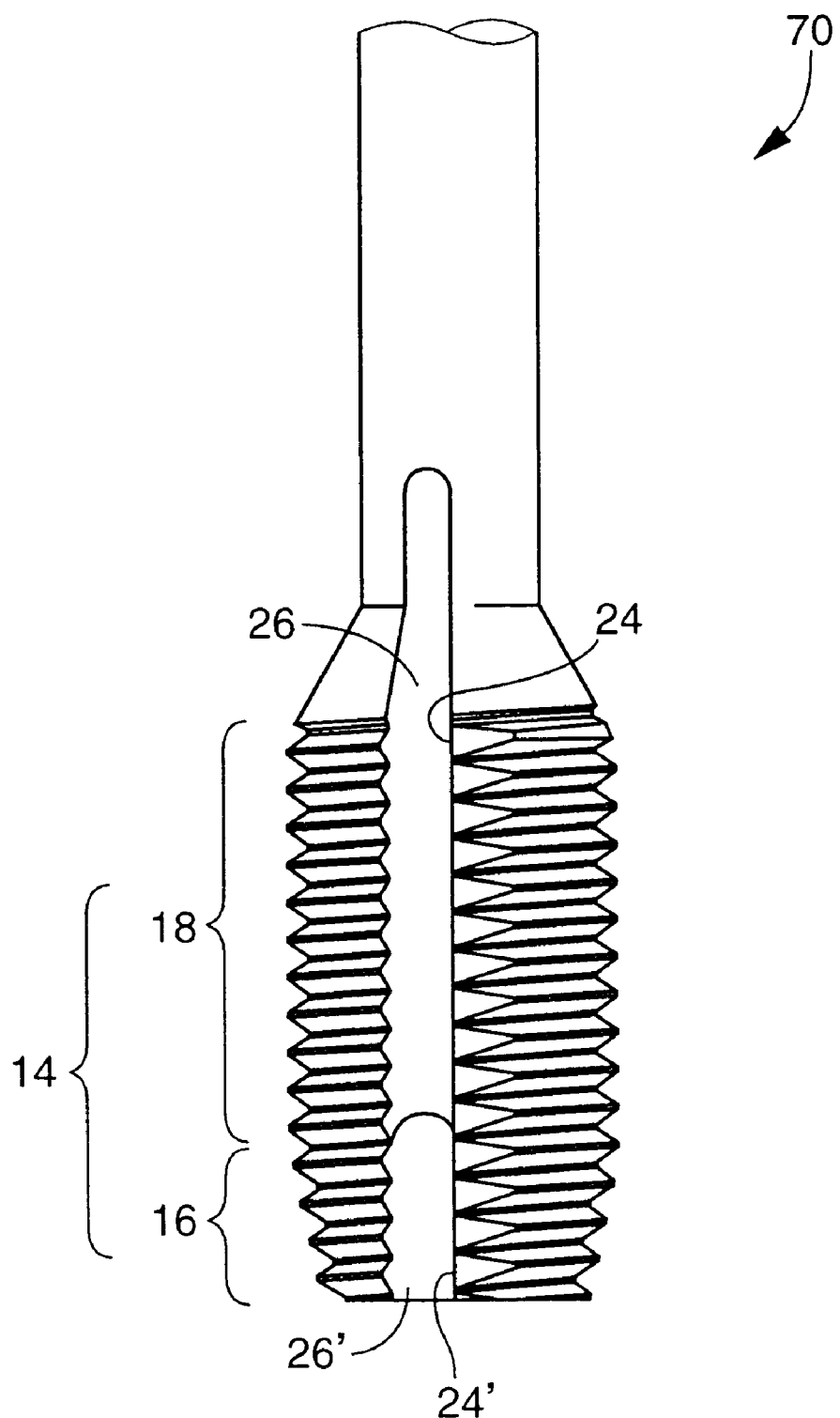
FIG. 12 is a view corresponding to FIG. 1, which shows a further embodiment of the present invention.

FIG. 12 is a view showing in enlargement an essential part of a cold forming tap 70 according to a still further embodiment of this invention. As shown in the figure, a second ground surface A' and a second flute 26' are formed throughout the tapered leading portion 16 in the axial direction. The second ground surface A' is obtained by removing the protruding portions 20' down to the root by surface grinding. The second flute 26' is located adjacent to the flute 26. The second ground surface A' and the ground surface A have the same cross sectional shape with each other, and the second flute 26' and the flute 26 have the identical cross sectional shape with each other. The second ground surface A' and the second flute 26' extend in a direction inclined with respect to the axis of the tap 70 by an angle substantially equal to a half of the taper angle of the tapered leading portion 16, for forming a second cutting edge 24' which extends throughout the tapered leading portion 16 in the axial direction and which is obtained by removing those of the protruding portions 20, 20' which are axially adjacent to each other, down to the root. According to the present embodiment, the second cutting edge 24' serves to remove the surplus stock reaching the root of the thread at the tapered leading portion 16 which receives a larger cold forming load than the other portions of the tap. Therefore, the second cutting edge 24' is effective to reduce the torque acting on the tap 70 and suitably prevent a breakage of the tap 70 even where an internal thread is to be formed in a small hole, e.g., a tapered hole formed in the casting process of the workpiece.

While some embodiments of the present invention have been explained on the basis of the drawings, the present invention is applicable in the other forms.

In the above-described embodiments, for example, the protruding portions 20' each of which corresponds to every second or every third of the protruding portions 20, 20' formed along the predetermined helix are removed. However, every desired number of the protruding portions 20, 20' may be removed down to the root, provided the desired number is a number which is a divisor of the number of the protruding portions 20, 20' per lead of the external thread portion 14 and which is other than "one", so that the removed protruding portions 20' are located successively and adjacently to each other in the axial direction. Where there are four protruding portions 20, 20' per lead of the external thread portion 14, for example, every second protruding portions 20' (two protruding portions per lead) or every fourth protruding portions 20' (one protruding per lead) is removed. Where there are six protruding portions 20, 20' per lead of the external thread portion 14, every second protruding 20' (three protruding portions per lead), every third protruding portions 20' (two protruding portions per lead) or every sixth protruding portions 20' (one protruding per lead) is removed.

In the above-described embodiment of FIG. 1, the cutting edge 24 and the flute 26 are both formed to extend throughout the external thread portion 14 in the axial direction. However, the cutting edge 24 and the flute 26 may be formed at both or either of a portion of the external thread portion 14 and a portion of the tapered leading portion 16. This arrangement also offers substantially the same effect as in the embodiment of FIG. 1. The above-indicated portion of the external thread portion 14 preferably consists of a portion of the external thread portion 14 which is adjacent to the tapered leading portion 16, and an entire axial length of the tapered leading portion 16. The above-indicated portion of the tapered leading portion 16 preferably consists of a portion of the tapered leading portion 16 which is adjacent to the full-form thread portion 18.

Further, in the above-described embodiment of FIG. 1, the ground surfaces A and the flutes 26 are formed to extend linearly and parallel to the axis of the cold forming tap 10. However, the ground surfaces A and the flutes 26 may be formed to helically extend, and oil grooves may be formed independently of the flutes 26 so as to linearly or helically extend throughout the entire axial length of the external thread portion 14. In the latter case, the oil grooves may communicate with the flutes 26 on the way in the axial direction.

Still further, each of the cold forming taps 10, 50, 60, 62, 64, 70 of the above-described embodiments may have a surface which is hardened by a suitable nitriding treatment or coated with a coating material such as TiN or TiCN, or alternatively the entire body of the tap may consist of high-speed steel having a hardness of HRC 64-70, cemented carbide having a hardness of HRC 85-95, or fine-grain cemented carbide. Further, each of the cutting edges 24 may have a surface which is coated with a hard carbon film.

Still further, in the above embodiments, the diameter of the cutting edges 24, i.e., the maximum diameter of the root is equal to the minor diameter of the internal thread. This means that the diameter of the cutting edges 24 is determined to be substantially within a required tolerance of the minor diameter of the internal thread to be formed.

Figure 13:
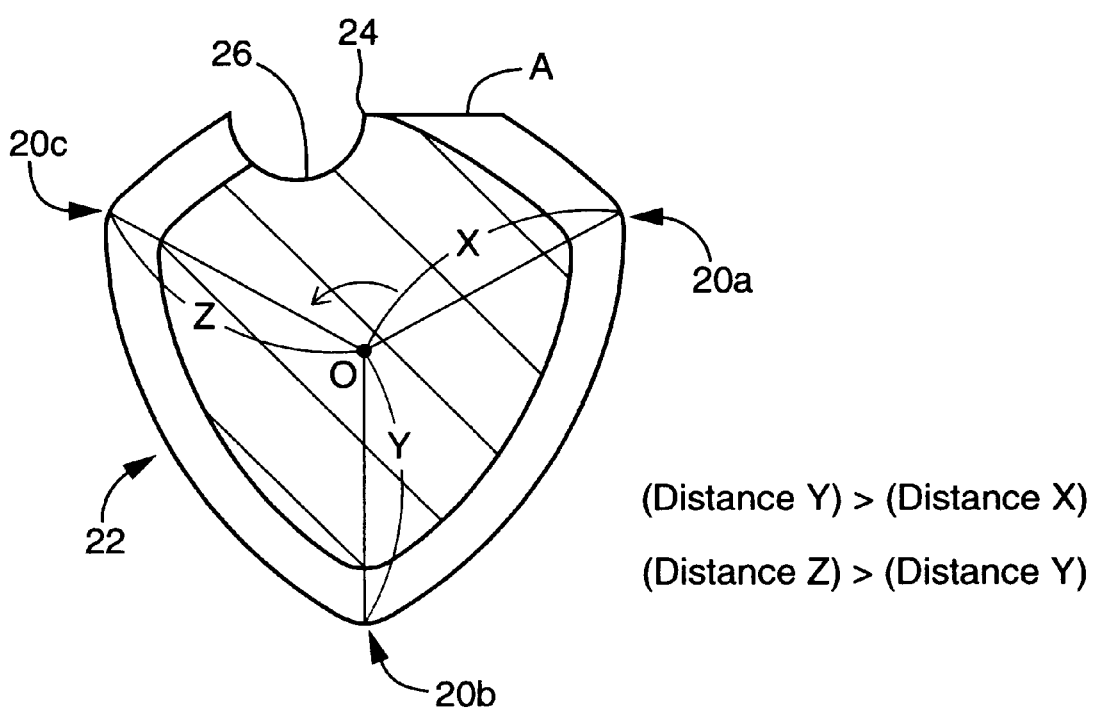
FIG. 13 is a view corresponding to FIG. 2, which shows a further embodiment of the present invention.

Still further, in the above embodiments, the protruding portions 20 are formed to have the same height. However, where the removed protruding portions 20' are provided at a predetermined interval in the circumferential direction so as to provide the two or more non-removed protruding portions 20 between the adjacent flutes 26, these protruding portions 20 may have different heights such that the height of a rear side one of the adjacent two protruding portions 20 as viewed in the rotating direction is larger than that of the other protruding portion 20 which is located on the forward side of the above-indicated rear side one of the adjacent two protruding as shown in FIG. 13, so that all of the protruding portions 20 are uniformly loaded with the plastic deformation resistance. This arrangement is effective to suitably prevent the protruding portions 20 from being broken, leading to improved durability of the cold forming tap.

While the embodiments of the present invention have been described above for illustrative purpose only, the present invention may be embodied with various modifications, without departing from the spirit of the purpose.

INDUSTRIAL APPLICABILITY

As described above, the cold forming tap having the internal finish cutting edge is suitable for forming an internal thread in a workpiece by plastic deformation of the workpiece.

What is claimed is:

1. A cold forming tap for forming an internal thread on an inner surface of a prepared hole previously formed in a workpiece, by plastically deforming the inner surface of the prepared hole, comprising:

a cutting edge for finishing a minor diameter of said internal thread to be formed by said cold forming tap, and an external thread portion in which an external thread is formed to extend in a helical direction of said cold forming tap, and which has, in a cross section thereof perpendicular to an axial direction of said cold forming tap, a polygonal shape defined by outwardly arching sides, said external thread portion including radially outwardly protruding portions and relief portions which are adjacent to and have a diameter smaller than said protruding portions;

wherein said protruding portions and said relief portions are alternately located in said helical direction, such that said protruding portions are spaced apart from each other at predetermined angular intervals in a circumferential direction of said cold forming tap, and such that said relief portions are spaced apart from each other at predetermined angular intervals in said circumferential direction, said protruding portions being forced into the inner surface of the prepared hole of the workpiece, for plastically deforming the inner surface whereby said internal thread is formed on the inner surface;

and wherein at least one of said protruding portions within each lead of said external thread has a root diameter larger than that of the other of said protruding portions, said at least one of said protruding portions being removed down to a root of said external thread so as to provide a tangent surface which is tangent to the root, the cutting edge being defined by a flute which is formed in said tangent surface and which extends in said axial direction of said cold forming tap.

2. A cold forming tap according to claim 1, wherein every predetermined number of said protruding portions, as counted in said helical direction, is removed down to said root, said predetermined number being a divisor of the number of said protruding portions per lead of said external thread other than "one", so that the removed protruding portions are adjacent to each other in said axial direction.

3. A cold forming tap according to claim 2, wherein said removed protruding portions cooperate with each other to extend over an entire axial length of said external thread portion.

4. A cold forming tap according to claim 1, wherein said external thread portions includes a tapered leading portion and a full-form thread portion which is adjacent to one of opposite ends of said tapered leading portion that is nearer to a proximal end of said cold forming tap, said tapered leading portion having an outside diameter which decreases in a direction toward a free end of said cold forming tap, while said full-form thread portion having an outside diameter which is constant in said axial direction of said cold forming tap.

5. A cold forming tap according to claim 4, wherein said flute is formed over at least an entire axial length of said tapered leading portion.

6. A cold forming tap according to claim 4, wherein said flute is formed over at least an entire axial length of said tapered leading portion and a portion of said full-form thread portion which is adjacent to said tapered leading portion.

7. A cold forming tap according to claim 4, wherein said flute is formed over at least a portion of said full-form thread portion which is adjacent to said tapered leading portion and a portion of said tapered leading portion which is adjacent to said full-form thread portion.

8. A cold forming tap according to claim 4, wherein said at least one of protruding portions in said tapered leading portion is removed down to said root along a plane which is inclined with respect to an axis of said cold forming tap by an angle substantially equal to a half of a taper angle of said tapered leading portion, and a second flute is formed in a portion corresponding to said root of said at least one of said protruding portions in said tapered leading portion, so as to provide a second cutting edge in said portion corresponding to said root of said at least one of said protruding portions in said tapered leading portion.

9. A cold forming tap according to claim 7, wherein said tapered leading portion has an oil groove formed therein, such that said oil groove is adjacent to said flute and extends up to a free end of said tapered leading portion.

10. A cold forming tap according to claim 9, wherein said oil groove is formed in a plane which is inclined with respect to an axis of said cold forming tap by an angle substantially equal to a half of a taper angle of said tapered leading portion.

11. A cold forming tap according to claim 1, further including an oil groove which is formed over an entire axial length of said external thread portion.

12. A cold forming tap according to claim 1, wherein said flute and said at least one of said protruding portions which has been removed down to said root are formed to extend linearly and parallel to said axis of said cold forming tap.

13. A cold forming tap according to claim 1, wherein said flute and said at least one of said protruding portions which has been removed down to said root are formed to extend helically and parallel to said axis of said cold forming tap.

14. A cold forming tap according to claim 1, wherein said external thread portion has a substantially square cross sectional shape defined by four sides each of which is outwardly arched.

15. A cold forming tap according to claim 1, wherein said external thread portion has a substantially hexagonal cross sectional shape defined by six sides each of which is outwardly arched.

16. A cold forming tap according to claim 1, wherein said external thread portion has a substantially triangular cross sectional shape defined by three sides each of which is outwardly arched.

17. A cold forming tap according to claim 4, wherein at least said protruding portions and a portion of said cutting edge which are located in said tapered leading portion are constituted by a cemented carbide which is bonded on a circumferential portion of a body of said cold forming tap which is made of an alloy steel.

18. A cold forming tap according to claim 1, wherein said protruding portions remaining unremoved have respective radial distances from an axis of said cold forming tap such that the radial distance of a rear side one of the adjacent two of said protruding portions remaining unremoved as viewed in said rotating direction is larger than that of the other of said adjacent two which is located on a forward side of said rear side one as viewed in said rotating direction.

19. A cold forming tap for forming an internal thread on an inner surface of a prepared hole previously formed in a workpiece, by plastically deforming the inner surface of the prepared hole, comprising:

a cutting edge for finishing a minor diameter of said internal thread to be formed by said cold forming tap, and an external thread portion in which an external thread is formed to extend in a helical direction of said cold forming tap and which has, in a cross section thereof perpendicular to an axial direction of said cold forming tap, a polygonal shape defined by outwardly arching sides, said external thread portion including radially outwardly protruding portions and relief portions which are adjacent to and have a diameter smaller than said protruding portions;

wherein said protruding portions and said relief portions are alternately located in said helical direction, such that said protruding portions are spaced apart from each other at predetermined angular intervals in a circumferential direction of said cold forming tap, and such that said relief portions are spaced apart from each other at predetermined angular intervals in said circumferential direction, said protruding portions being formed into the inner surface of the prepared hole of the workpiece, for plastically deforming the inner surface whereby said internal thread is formed on the inner surface;

wherein at least one of said protruding portions within each lead of said external thread has a root diameter larger than that of the other of said protruding portions, said at least one of said protruding portions being removed down to a root of said external thread as to provide a tangent surface which is tangent to said root; and wherein said cutting edge is defined by a flute which is formed in said tangent surface and which extends in said axial direction of said cold forming tap, such that said flute is located on a forward side, as viewed in a rotating direction of said cold forming tap, of a minimum diameter position lying on said tangent surface so that the said cutting edge is located in said maximum diameter position.

20. A cold forming tap for forming an internal thread on an inner surface of a prepared hole previously formed in a workpiece, by plastically deforming the inner surface of the prepared hole, comprising:

a cutting edge for finishing a minor diameter of said internal thread to be formed by said cold forming tap, and an external thread portion in which an external thread is formed to extend in a helical direction of said cold forming tap, said external thread portion including radially outwardly protruding portions and relief portions which are adjacent to and have a diameter smaller than said protruding portions;

wherein said protruding portions and said relief portions are alternately located in said helical direction, such that said protruding portions are spaced apart from each other at predetermined angular intervals in a circumferential direction of said cold forming tap, and such that said relief portions are spaced apart from each other at predetermined angular intervals in said circumferential direction, said protruding portions being forced into the inner surface of the prepared hole of the workpiece, for plastically deforming the inner surface whereby said internal thread is formed on the inner surface;

wherein at least one of said protruding portions within each lead of said external thread has a root diameter larger than that of the other of said protruding portions, said at least one of said protruding portions being removed down to a root of said external thread so as to provide a tangent surface which is tangent to said root, and said cutting edge being defined by a flute which is formed in said tangent surface and which extends in said axial direction of said cold forming tap;

wherein said external thread portion includes a tapered leading portion and a full-form thread portion which is adjacent to one of opposite ends of said tapered leading portion that is nearer to a proximal end of said cold forming tap, said tapered leading portion having an outside diameter which decreases in a direction toward a free end of said cold forming tap, while said full-form thread portion having an outside diameter which is constant in said axial direction of said cold forming tap; and wherein at least said protruding portions and a portion of said cutting edge which are located in said tapered leading portion are constituted by a cemented carbide which is bonded on a circumferential portion of a body of said cold forming tap which is made of an alloy steel.

* * * * *